Figure 1:
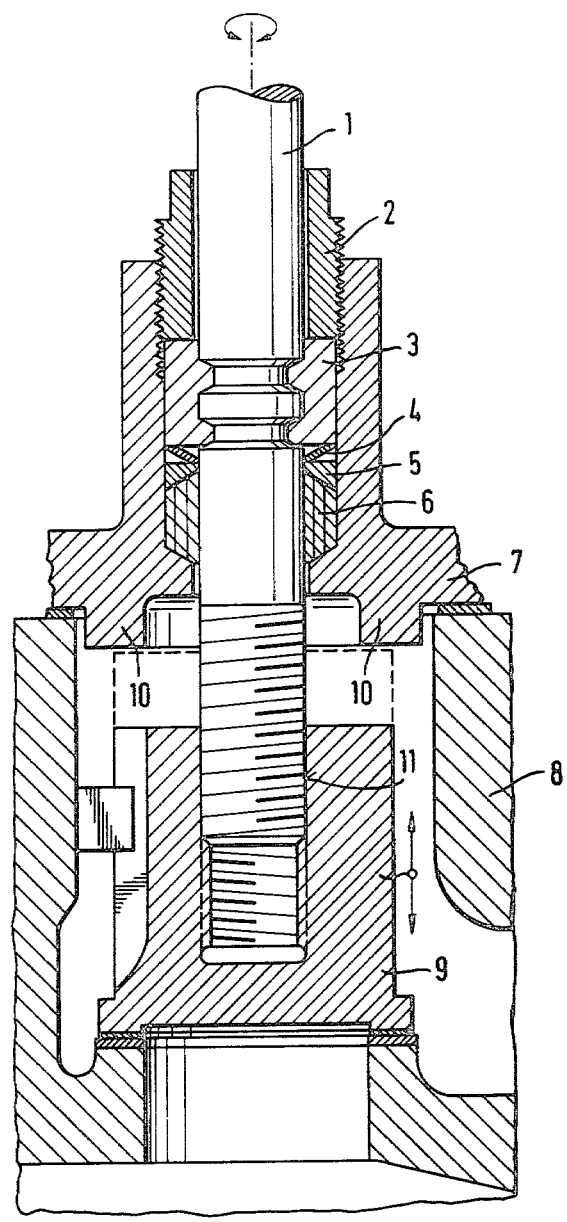

United States Patent [19]

Kärkkäinen

[11] 4,317,573
[45] Mar. 2, 1982

[54] VALVE SPINDLE SEALING ARRANGEMENT

[75] Inventor: Jouko Kärkkäinen, Pietarsaari, Finland

[73] Assignee: Oy Wartsila Ab, Helsinki, Finland

[21] Appl. No.: 84,911

[22] Filed: Oct. 15, 1979

[30] Foreign Application Priority Data

Oct. 16, 1978 [FI] Finland .................................. 783137

[51] Int. Cl.³ .............................................. F16K 31/50
[52] U.S. Cl. ................................... 277/113; 277/114; 251/214
[58] Field of Search ....................... 251/214, 213, 266; 277/102, 113, 114

[56] References Cited

U.S. PATENT DOCUMENTS

| | | | |
|---|---|---|---|
| 473,554 | 4/1892 | Holly | 277/113 |
| 1,698,439 | 1/1929 | Johnson | 251/214 |
| 1,699,036 | 1/1929 | Welsh | 277/114 |
| 2,912,266 | 11/1959 | Nordell | 277/114 |
| 4,087,075 | 5/1978 | Nechanicky | 251/214 |

Primary Examiner—Robert I. Smith
Attorney, Agent, or Firm—McAulay, Fields, Fisher, Goldstein & Nissen

[57] ABSTRACT

A sealing arrangement for sealing the lead-through of a valve spindle through the cover portion of a valve. The spindle is connected to a movable valve body. There is a radially supported elastic stuffing surrounding the spindle and an attachment member axially supporting the stuffing. In the inner space of the valve there is a stationary stop member for the valve body. The stop member prevents axial movement of the valve body, beyond the fully open position of the valve. The reaction force induced in the stop member by the valve body influences the stuffing via the spindle and causes an increased axial compression in the stuffing. Thereby, the stuffing, due to its elasticity, is pressed more firmly against its radial support, and thus, gives a better sealing effect in the fully open position of the valve.

4 Claims, 2 Drawing Figures

VALVE SPINDLE SEALING ARRANGEMENT

The invention relates to a sealing arrangement for sealing a lead-through of the spindle of a valve body through a cover portion of a valve, which arrangement comprises a radially supported, elastic stuffing surrounding the spindle and an attachment member axially supporting the stuffing.

In known valves, in particular in valves designed for great pressures or dangerous media, a so called back-sealing mechanism is generally used, whereby, in the valve housing, in front of the actual stuffing of the spindle a sealing surface is formed by means of ground metal surfaces, which functions as a seal when the valve body is in its open position. If a back-sealing of this kind is completely tight, a closed space is formed between it and the above mentioned spindle stuffing, where the enclosed medium, for instance, due to the changes in temperature, may give rise to great pressures. Such a pressure may release itself, for instance, through the above mentioned spindle stuffing causing leakage and wear in the stuffing. In addition, depending on the medium, the medium penetrating into these closed spaces, and due to the above mentioned pressures, into the whole sealing construction, may cause dangerous corrosion, which cannot be seen from the outside of the valve.

On the other hand, because the back-sealing surfaces are located in the valve housing, they are in direct contact with the medium and get dirty and are exposed to the wearing influence of the medium. Due to this the back-sealing is not very often tight in practice, due to which the spindle stuffing has to be tightened, whereby a greater power is needed to operate the valve and the stuffing is worn fast. Naturally, these disadvantages are evident also when the valve has no back-sealing at all.

The object of the invention is to create a valve spindle sealing arrangement as reliable as possible, which is suitable to use also in connection with dangerous media and high pressures, but in which the above described disadvantages of known sealing arrangements have been eliminated. The invention is characterized in that there is, in the inner space of the valve, a stationary stop member for the valve body, which member, when rotating the spindle in the open position of the valve, further in the opening direction of the valve, is arranged to prevent at least substantially the axial movement of the valve body, and that the reaction force thereby induced in said stop member is arranged to influence the stuffing via the spindle so as to obtain an increased axial compression in said stuffing, so that the stuffing, due to its elasticity, is pressed more firmly against its radial support. In this way, when the valve is in its open position, or in other words, when the need of a sealing function is greatest, additional pressure is in a simple way introduced in the stuffing. Hence, the stuffing is always tight in use and it can occasionally be tightened without tools, for instance, by means of the hand wheel with which the valve spindle is rotated. Since the valve body does not have to be pressed tightly against said stop member, the stuffing construction will not be subject to the over pressures referred to above. In addition, the influence of the medium flowing through the valve on the sealing surfaces is reduced to a minimum, due to which the sealing surfaces will not get dirty. During the movement of the valve body and the spindle or when the valve is in closed position, there is a smaller pressure in the stuffing, whereby the valve is light to use and the wear of the stuffing and of the spindle is reduced, which increases their lifetime.

For transmitting the axial compression force to the stuffing, it is of advantage to connect to the stuffing a load transmitting member influencing the stuffing axially.

For obtaining an axial movement and further said stuffing compressing axial force in the spindle it is of advantage to provide the spindle with threads, axially moving the valve body relative to the spindle. Thereby, the spindle does not have to make any axial movement at all, but said threads move the valve body axially when the spindle is rotated. By this means, the stuffing surfaces are in continuous contact with each other, which effectively prevents their getting dirty and worn.

Causing an axial compression in the stuffing can also be made so that the spindle is connected with threads to said load transmitting member for transmitting an axial movement to said load transmitting member, when the spindle is further rotated in the open position of the valve. In this case, said load transmitting member can advantageously be arranged to give the spindle radial guidance.

Said load transmitting member can advantageously be located between the attachment member and the stuffing.

The stop member for the valve body may surround the spindle, and be a rigid constructional part of the cover portion of the valve. thus, a reaction force acting on the valve body is obtained in said stop member, and the axial movement causing a force compressing the stuffing is performed by said load transmitting member. On the other hand, the stuffing may also be compressed directly from the inside of the valve by means of the valve body, whereby said load transmitting member can be used for producing a reaction force. In this case, said stop member for the valve body may be a separate, sleeve-formed member transmitting compression force from the valve body to the stuffing.

The sealing arrangement may also be provided with a flexible auxiliary element, which together with the attachment member and said load transmitting member is arranged to maintain a certain basic axial compression in said stuffing. The flexible auxiliary element may with advantage be located either between said load transmitting member and the stuffing or between the load transmitting member and the attachment member.

Figure 2:
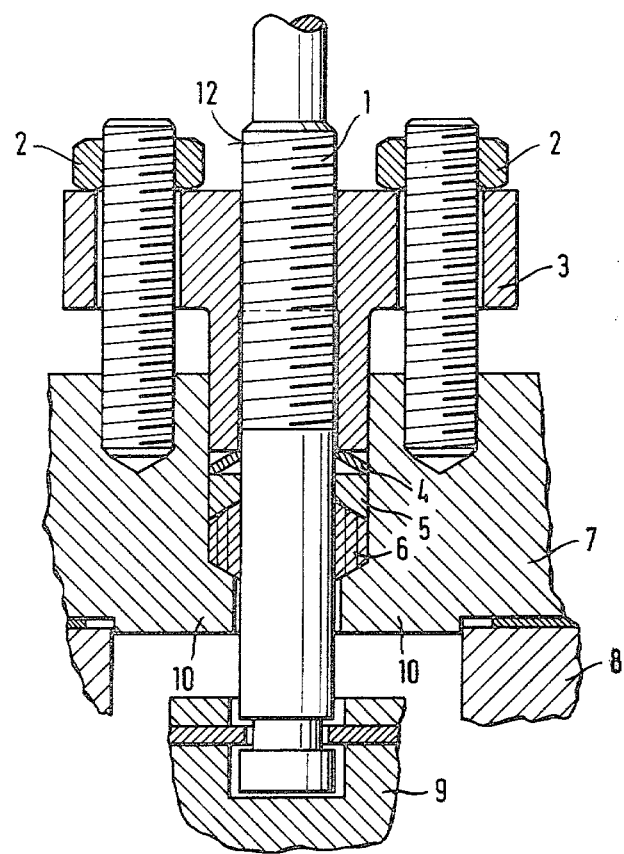

In the following, the invention will be described more in detail with reference to the attached drawings, in which FIG. 1 shows an axial section of an embodiment of the invention, FIG. 2 shows an axial section of another embodiment of the invention.

In the drawings, reference numeral 8 indicates the housing of a valve, to which a cover 7 is attached. A spindle 1 with a valve body 9 at its end passes through cover 7. For sealing the lead-through there is a stuffing 6, a compression member 5, a flexible auxiliary element 4, a load transmitting member 3 and an attachment member 2. At the inside of the valve there is, in the cover 7, a stop member 10 for valve body 9.

In the case shown in FIG. 1, valve body 9 is in its closed position. Thereby flexible auxiliary element 4 together with compression member 5 compresses stuffing 6 with a certain force using attachment member 2 and load transmitting member 3 as back-up members. In this embodiment, valve body 9 is attached to spindle 1 by means of threads 11 so that by rotating spindle 1 valve body 9 moves against stop member 10. The position of the valve body in its fully open position is shown by broken lines. When rotating of spindle 1 is continued, valve body 9 is pressed more tightly against stationary stop member 10, which is a part of cover 7, whereby the reaction force induced in the stop member is transmitted through spindle 1 and load transmitting member 3, attached thereto, a stuffing 6, in the form of an axial compression force, so that stuffing 6 is more tightly pressed against spindle 1, thereby preventing the medium inside the valve from leaking through the lead-through of spindle 1. Rotating of spindle 1 when opening or closing the valve requires only a small force because additional compression of stuffing 6 is obtained only in the fully open position of valve body 9. The continuous contact between the sealing surfaces effectively eliminates harmful influence of the medium inside the valve.

In embodiment shown in FIG. 2, the additional compression of the stuffing 6 is carried out principally as above. However, the difference is that the valve body 9 does not move axially relative to the spindle 1, but in the open position of the valve the axial movement induced for auxiliary compression is transmitted in this case by means of a thread 12 to load transmitting member 3, which then moves relative to spindle 1 causing the mentioned compression. In this embodiment load transmitting member 3 is arranged to guide the spindle 1 relative to the cover of the valve 2.

If wanted, the sealing arrangement according to the invention can also be used with known back-sealing constructions.

The invention is not limited to the embodiments shown but several modifications are feasible within the scope of the attached claims.

I claim:

1. A sealing arrangement for a valve comprising a rotatable valve spindle connected to a valve body, said spindle passing through a cover portion of said valve, said arrangement comprising a radially supported elastic stuffing surrounding said spindle, an attachment member axially supporting said stuffing, and, in the inner space of said valve, a stationary stop member for said valve body, said stop member, being arranged to prevent at least substantially the axial movement of said valve body, when said spindle, in the open position of the valve, is further rotated in the opening direction of the valve, whereby a reaction force is induced in said stop member, which force is arranged to influence said stuffing via said spindle so as to obtain an increased axial compression in said stuffing, thereby pressing said stuffing, due to its elasticity, more firmly against its radial support, and for obtaining an axial movement transformable to a stuffing compressing axial force in said spindle, there are threads connecting said valve body to said spindle, said threads giving the valve body an axial movement relative to the spindle, when the latter is rotated.

2. A sealing arrangement according to claim 1, in which a load transmitting member, arranged to influence said stuffing axially, is connected to said spindle for transmitting said axial compression force to said stuffing.

3. A sealing arrangement according to claim 1, in which there is a flexible auxiliary element, which together with said attachment member and said load transmitting member is arranged to maintain a basic axial compression in said stuffing.

4. A sealing arrangement according to claim 3, in which said auxiliary element is located between said load transmitting member and said stuffing.

* * * * *